United States Patent [19]
Soref et al.

[11] Patent Number: 5,140,651
[45] Date of Patent: Aug. 18, 1992

[54] SEMICONDUCTIVE GUIDED-WAVE PROGRAMMABLE OPTICAL DELAY LINES USING ELECTROOPTIC FABRY-PEROT ELEMENTS

[75] Inventors: Richard A. Soref, Newton Centre, Mass.; Henry F. Taylor, College Station, Tex.

[73] Assignee: The United States of America as Represented by the Secretary of the Air Force, Washington, D.C.

[21] Appl. No.: 722,032

[22] Filed: Jun. 27, 1991

[51] Int. Cl.⁵ ............................................. G02F 1/015
[52] U.S. Cl. ............................................ 385/2; 359/140; 359/173; 359/179; 359/260; 385/27; 385/39
[58] Field of Search ........................... 455/610, 612; 350/96.10, 96.13, 96.15, 96.14, 96.16, 96.29, 96.30, 266, 353–356; 356/352; 359/140, 153, 161, 173, 179, 188, 193, 195, 260; 385/1–3, 8, 27, 39, 40, 123, 147

[56] References Cited

U.S. PATENT DOCUMENTS

| | | | |
|---|---|---|---|
| 3,714,438 | 1/1973 | Hahn et al. | 350/266 X |
| 3,863,063 | 1/1975 | Indig et al. | 455/610 |
| 4,198,115 | 4/1980 | Kaminow | 350/96.14 |
| 4,558,920 | 12/1985 | Newton et al. | 350/96.15 |
| 4,730,327 | 3/1988 | Gordon | 372/45 |
| 4,737,962 | 4/1988 | Yamamoto et al. | 372/49 |
| 4,782,492 | 11/1988 | McMahon et al. | 350/96.29 X |
| 4,792,962 | 12/1988 | Miyauchi et al. | 372/94 |
| 5,023,947 | 6/1991 | Cimini, Jr. et al. | 356/352 X |

*Primary Examiner*—John D. Lee
*Attorney, Agent, or Firm*—Robert L. Nathans; Donald J. Singer

[57] ABSTRACT

Electrically controlled Fabry-Perot resonator elements are created in a semiconductor channel waveguide by etching two in-channel mirror facets (slots) and by positioning the resulting resonator core in the midregion of a P-I-N diode or field-effect transistor. A large number of FPs can be built monolithically on one semiconductor chip, with FPs connected by on-chip passive waveguides used for multiple on-chip time delays. The low-loss chips are coupled efficiently in end-fire fashion to a group of optical fibers that comprise the optical signal processing system. III-V quantum-well, superlattice, and n-i-p-i materials are preferred for the semiconductor devices, and a variety of electrooptical effects are available for use, including the quantum-confined Stark effect, phase-space absorption quenching, Wannier-Stark effect, plasma dispersion effect, and band-flattening.

31 Claims, 3 Drawing Sheets

SEMICONDUCTIVE GUIDED-WAVE PROGRAMMABLE OPTICAL DELAY LINES USING ELECTROOPTIC FABRY-PEROT ELEMENTS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of electrooptic signal processors.

Fiber optic delay lines are valuable for a variety of optical signal-processing applications. Prior work by Taylor et al (C. E. Lee, R. A. Atkins, and H. F. Taylor, "Reflectively Tapped Optical Fiber Transversal Filters," Electronic Letters, vol. 23, 596, 1987) has shown how fixed delays can be incorporated into a fiber. Additional work by Taylor et al has shown that Fabry Perot (FP) resonators made from glass fiber can be spliced into a fiber transmission line, and that the transfer-characteristic of those FPs can be altered by thermal means, thereby making the FP reflective or transmissive. See: S. Gweon, C. E. Lee, and H. F. Taylor, "Wideband Fiber Optic Signal Processor," IEEE Photonics Technology Letters, vol. 1, December 1989; H. F. Taylor, "Method for Producing Reflective Taps in Optical Fibers and Applications. Thereof," U.S. Pat. No. 4,848,999, issued July 1989. However, this work was limited because the thermal technique takes milliseconds to reconfigure the FP.

There is a need for fiber-compatible FP elements that can be reconfigured in microseconds or nanoseconds. FP elements are needed that have low optical loss and that couple efficiently in an end-fire manner to fibers or to on-chip waveguides. A variable-delay system comprised of optical fibers and fast FP elements is needed. A fiber system is required that contains a large number of electrically programmed elements that can be used to select one or several optical time-delay paths, and/or to insert signals onto the optical carrier. In this variable reflector system, we require reflection of an optical pulse at an addressed location on the guided optical path, while the unaddressed locations are transparent. Unbiased elements are needed that allow total transmission of the pulse to the next programmable element.

Some problems and limitations are also evident in previous approaches to optical time-delay steering of phased-array antennas: multiple glass fibers must be cut to exact lengths within less than 1 mm tolerance. Multiple optical sources or detectors are sometimes used to feed one antenna element, the extinction ratio of optical switches in this application tends to be less than 25 dB, the switches tend to be lossy, and individually fabricated control elements tend to be non-uniform.

SUMMARY OF THE INVENTION

Electrically controlled Fabry-Perot (FP) resonator elements are created in a semiconductor channel waveguide by etching two in-channel mirror facets and by positioning the resonator core in the midregion of a P-I-N diode or field-effect transistor in each FP element. A large number of FP elements can be built monolithically on one semiconductor chip, with FP elements connected by on-chip waveguides used for multiple on-chip time delays. The low-loss chips are coupled efficiently in end-fire fashion to a group of optical fibers that can be included in the optical signal processing system. III-V quantum-well, superlattice, and n-i-p-i materials are preferred for the FP elements, and a variety of electrooptical effects are available for use, including the quantum-confined Stark effect, phase-space absorption quenching, Wannier-Stark effect, plasma dispersion effect, and band-flattening.

More specifically, a plurality of such FP elements are tandemly positioned within a waveguide. The elements are selectively biased so that one of the tandemly positioned FP elements totally reflects the light, whereas the remaining elements transmit the light forwardly. The position of the element that is rendered reflective, establishes the round-trip light path length and hence the delay of the delay line. In another embodiment, additional variable length waveguide segments are selectively coupled in series with the delay line to further alter the round trip path length and hence the delay.

BRIEF DESCRIPTION OF THE DRAWINGS

FIG. 6 also illustrates a method of building relatively long delays into a single chip.

DETAILED DESCRIPTION

The waveguided semiconductor-and-glass variable delay structures in this invention are useful in several applications, namely optical control of phased-array antennas, sensors, high-speed local modulators for multiplexed local-area networks, signal processing for electronic countermeasures, and optical/rf transversal filters.

Now we can calculate the desired length L of the waveguided FP cavity of each FP element. This is a function of the maximum electrooptic perturbation $\Delta n$ within the cavity. If we define $\lambda$ as the optical wavelength, then the optical condition $$4\pi L \Delta n / \lambda = \pi$$

gives the FP length L needed to switch the resonator from being 100% reflecting to 100% transmitting. In other words, $$L = \lambda/(4\Delta n)$$

Now, we shall relate L to the 3-dB microwave bandwidth (B) of the FP reflector. We launch an optical signal $A_i(t)\, e^{i\omega t}$ into the cavity, where the amplitude $A_i$ is real. Then the amplitude $A_r$ of the reflected wave is:

$$A_r = \sqrt{R}\, e^{i\omega t}[A_i(t) + A_i(t-\tau)e^{-i\omega\tau + i\phi}]$$

where R is the reflectance of one of the mirrors, assuming low finesse ($R \ll 1$). The power of the reflected optical wave ($P_r$) is proportional to $A_r^2$, so $$P_r = R[A_i(t)^2 + A_i^2(t-\tau) + 2A_i(t)A_i(t-\Delta)e^{-i\omega\tau + i\phi}]$$

with the round-trip time delay in the interferometer ($\tau$) given by:

$$\tau = 2n_g L/c$$

where c is the free-space velocity of light and $n_g$ is the group refractive index. If the input waveform is amplitude modulated at a microwave frequency $f_m$, such that $$A_i(t) = A_o \cos(2\pi f_m t),$$

with $A_o$ a constant, then $$P_r = R A_o^2 [\cos^2(2\pi f_m [t-\tau])$$
$$\pm \cos(2\pi f_m t) \cos(2\pi f_m [t-\tau]) \cos(\omega\tau - \phi)$$

It can be shown from this expression that
$$B \approx 0.5/\tau$$

Hence, the FP length needed for a microwave bandwidth B is:

$$L = c/(4 n_g B).$$

Let us compare the glass fiber case with the semiconductor case. If a silica fiber ($n_g = 1.46$) contains a 1-mm-long FP, then $t = 9.7 \times 10^{-12}$ sec and the 3 dB bandwidth is about 50 GHz. If we consider GaAs or InP for which $n_g = 3.42$ or 3.21 at 1300 nm, respectively (we shall use an average of $n_g = 3.3$), we find at $L = 1$ mm that $\tau = 22 \times 10^{-12}$ sec and that B=23 GHz. If we use a shorter FP with L=100 μm, then the bandwidth is about 230 GHz!

Figure 1:
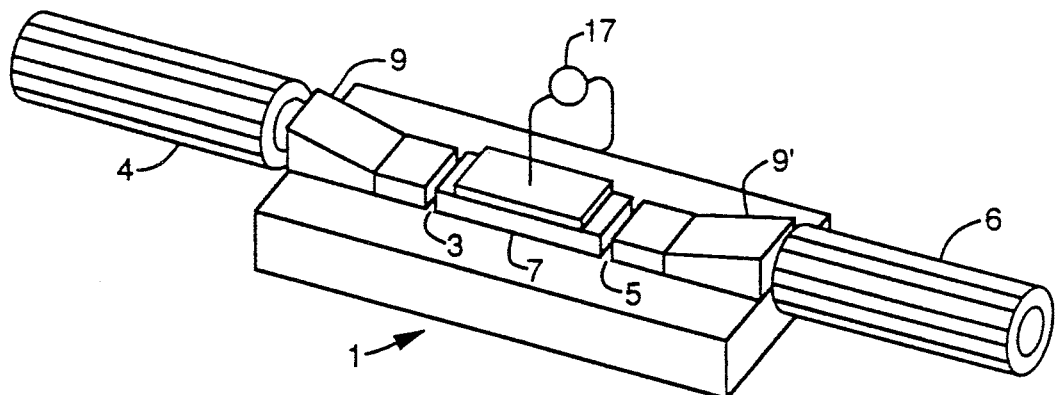
FIG. 1-4 illustrate various types of individual FP elements to be incorporated into the delay lines.

FIGS. 1-4 show the individual FP elements to be formed into the variable delay devices to be explained below. They are electrically biased to either cause the light to be transmitted through the elements or to be reflected, thereby to establish a given time delay. FIG. 1 shows the local-area FP element which is the simplest variable-delay element. The semiconductor material is fashioned into a rib-shaped channel waveguide which could also be a buried inverted rib position between glass fibers 4 and 6. The ridge waveguide uses heterostructures to assist in the guiding. A technique such as reactive ion etching is used to mill two deep gaps or slots 3 and 5 in the channel, thereby providing parallel end-facets for the FP resonator core etalon 7. Those slots can be filled with dielectric material via deposition in order to alter the reflection coefficients of the FP "mirrors." The reflectance would be in the range from 10% to 30%. The slots are quite thin, about two microns, so that the optical coupling loss due to diffraction is small between the passive waveguide section and the active etalon guide section. We show a vertical taper 9 and 9' of the rib to improve the end-fire coupling efficiency to the core of the single-mode glass fiber elements.

Figure 2:
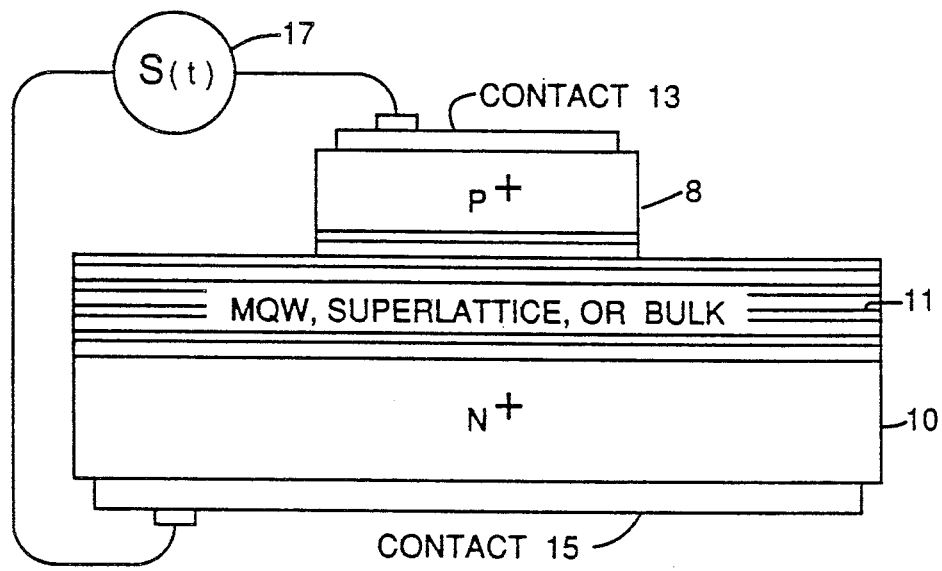

FIG. 1 and 2 also shows diode control. P and N doping is used in the semiconductor material 8 and 10 above and below the waveguide active region core 11 respectively. In this manner, the active semiconductor material, typically two microns thick, is located in the high resistivity region of a P-I-N diode. This is shown in more detail in FIG. 2, which is a cross-sectional diagram of the waveguide, where the waveguide core layer 11 can be microlayered, or consist of a bulk heterostructure. Light would preferably propagate parallel to the core layer 11 and into and out of the plane of the paper. The diode can be forward or reverse-biased, by electrical biasing means comprising electrodes 13 and 15, and voltage source 17, depending upon which physical effect is used, as will be explained below.

Figure 3:
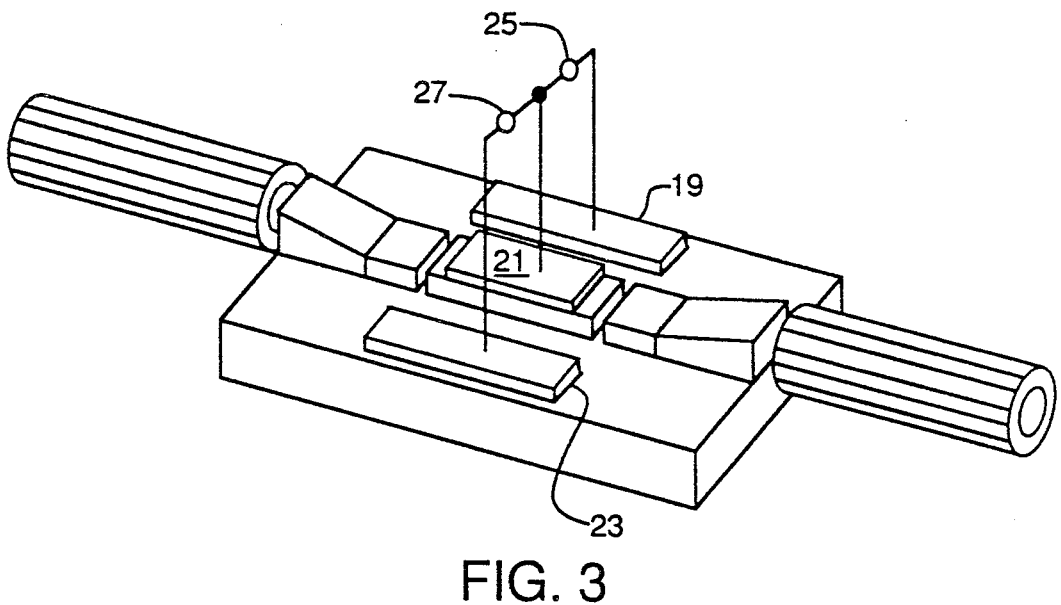

FIG. 3 shows 3-terminal electrical control of the waveguided FP etalon. Here, the active semiconductor region is located in the gate region of a field-effect transistor (FET) comprising source electrode 19, gate electrode 21, drain electrode 23 and voltage control sources 25 and 27. In this case, source and drain regions would be doped on either side of the channel. This controller offers more flexibility, and perhaps more speed, than the diode.

Figure 4:
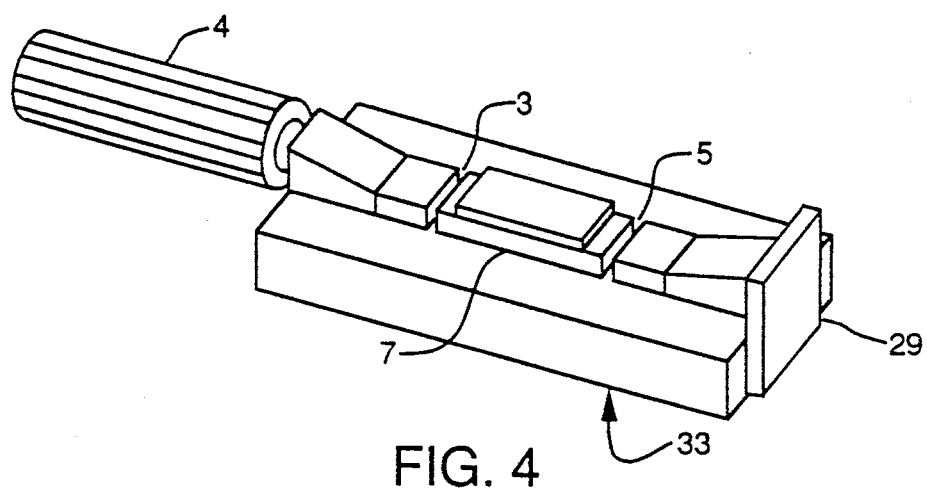

FIG. 4 shows a truncated fiber/chip device 33 of the fiber/chip/fiber device of FIG. 1. The FIG. 4 device would be used in reflective sensor applications and an absorbing optical coating 29 has been deposited on the free end in order to terminate the waveguided chip. Coating 29 absorbs about 100% of the light incident upon it.

Figure 5:
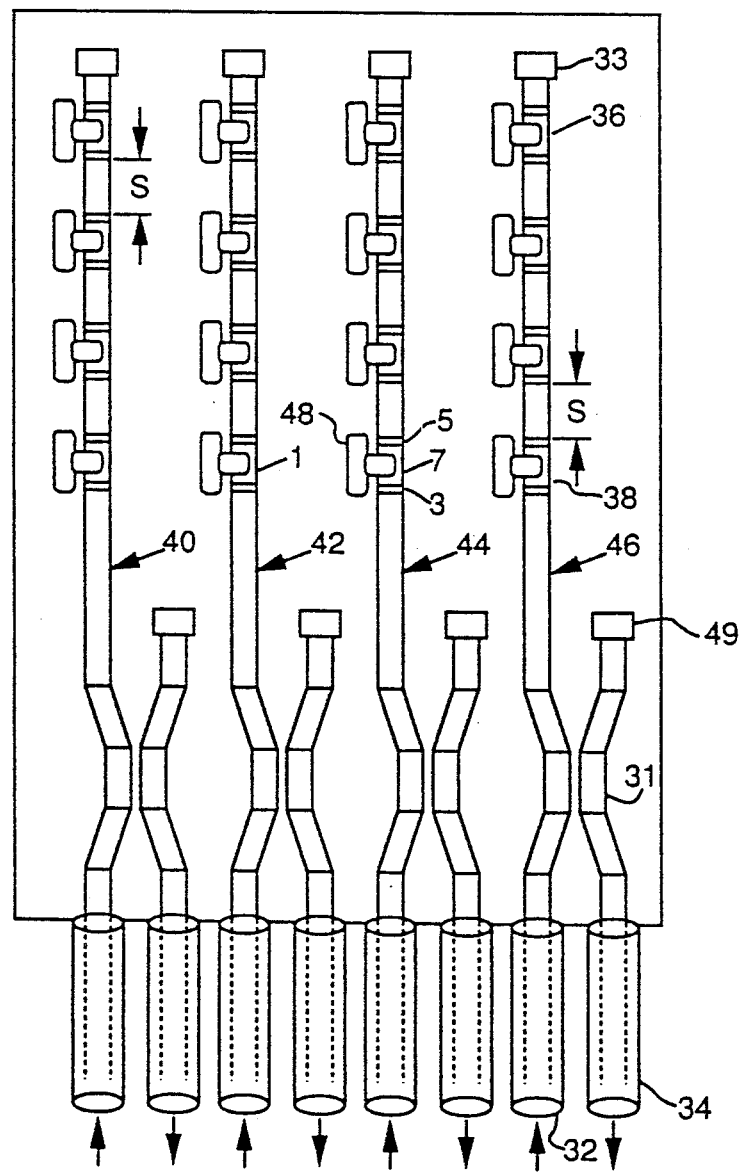
FIGS. 5 and 6 illustrate a preferred delay device useful in a phased-array beam steering application for example.
Figure 6:
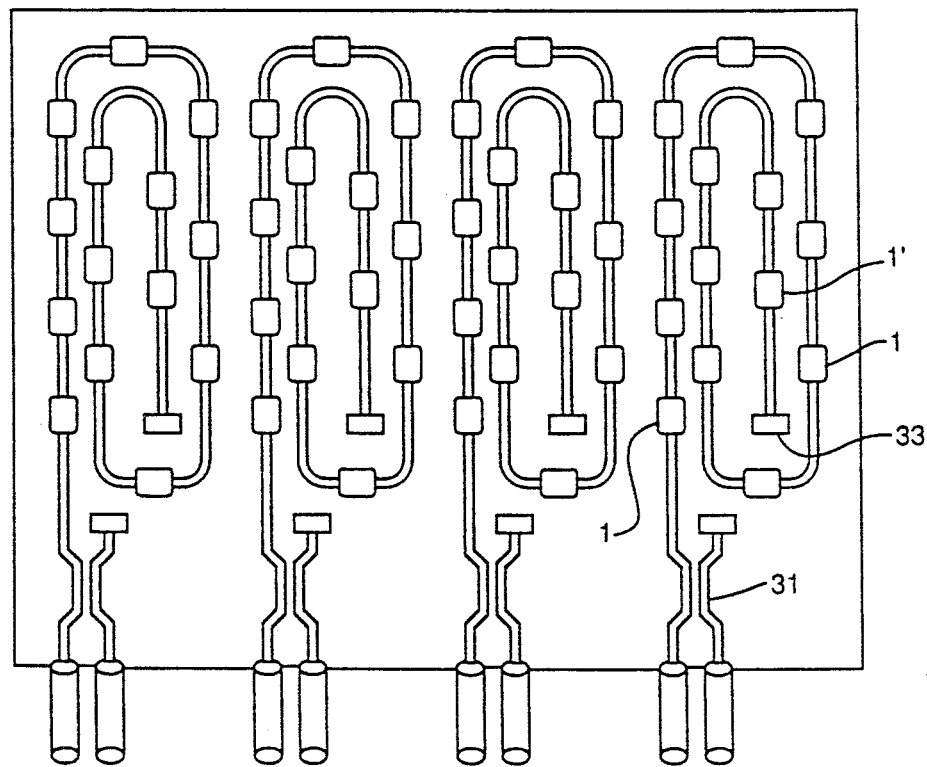

In FIGS. 5 and 6, we come to the preferred structure of a delay device useful in a phased-array beamsteering application, for example. We show in FIG. 5 the example of four programmable-delay lines 40, 42, 44, and 46, that are used to transport microwave-modulated optical signals to the phased-array antenna plane. Those signals are opto-electronically demodulated at the plane. The variable delay lines each consist of a channel-waveguided optical tandem series arrangement of electrically controlled FP elements, reflective or totally transmissive. There is an optical absorber 33 at the end of each line, and at the beginning of the fiber-coupled semiconductor line, there is a 3-dB optical directional coupler 31 to send the backward traveling optical signal to a separate output fiber as shown. The FP elements, in a typical case, would be uniformly spaced by a distance s. Thus, the incremental time delay between adjacent electrodes is 2sn/c, where n is the guide index and c is the speed of light. An absorber 49 is located at the end of the unused arm of each coupler 31.

More specifically, the light pulse entering at fiber 32 passes through the delay line and is reflected by whichever FP element is activated by the application of a pulse from the aforesaid voltage biasing sources, indicated by wire bond pads 48, coupled to the FP elements. If FP element 36 is activated, the round trip path is long and conversely, if 38 is activated, the round trip path is short. Thus selective activation of one of the tandemly positioned FP elements controls the delay time of the variable delay line. The directional coupler 31 may be supplied to steer the outgoing pulse to the output fiber 34. The coupler is conventional and is passively configured to perform this function.

FIG. 6 shows a way to build longer delays into one chip. Here, the reflective optical paths have been lengthened over those shown in FIG. 5, by coiling the channel waveguide into an elongated spiral with large-radius bends.

Figure 7:
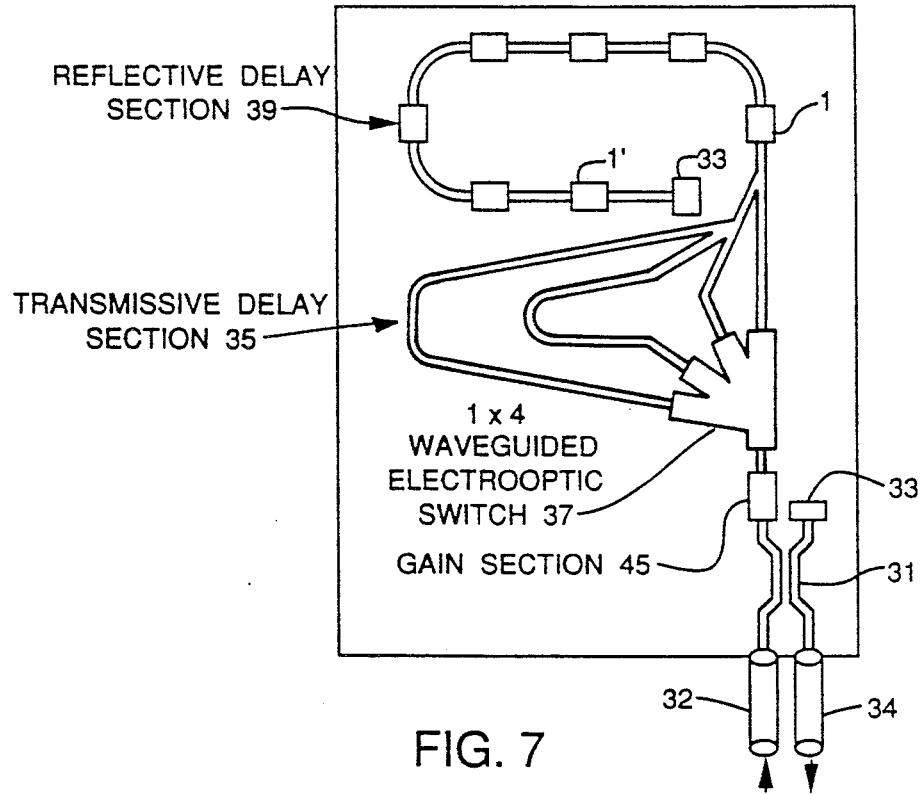
FIG. 7 illustrates a two-stage programmable delay device which can readily provide a large number of selected delays.

In FIG. 7, we show a two-stage programmable delay device that will be useful in phased-array antenna applications where the delay chip is required to provide a large number of delays such as 16 or 64. One stage 35 of four delay paths (lengths of 1,2,3, or 4 units of time delay) is used in transmission and the desired path is selected with a channel-waveguided 1×4 electrooptic switch 37. An additional stage 39 comprising the aforesaid variable delay line of FIGS. 5 and 6, is used in the reflective mode, and this is simply one channel with a linear array of selectable FP reflectors 1, and termination device 33 of FIG. 4; components 31, 32 and 34 of FIG. 5 may also be included. The delay in stage 35 is additive with the delay in stage 39. The net result of this two-stage cascade is a reflected optical pulse that makes two passes (forward and back) through the transmissive stage 35 and through the reflective stage 39. The virtue of this device is that the total number of delays is given by the product of the number in each stage: for example, the total number of selectable delays is 4×7, or 28 in this illustration. A gain or light amplification section 45 may compensate for the light losses in the device, rendering the device lossless.

The semiconductor electrooptic effects that are available for use in this invention may be classified as electric field effects or charge-carrier effects. In a forward-biased PIN diode, one typically gets carrier injection effects which are due to non-equilibrium concentrations of electrons and/or holes. In a reverse-biased diode, the equilibrium carriers are depleted (if the waveguide is locally doped with impurities) and a strong electric field is set up. So, one gets a combination of carrier effects and field effects in the reverse-biased case, and both effects change the real index of refraction. The proposed materials are GaAs/AlGaAs, InP/InGaAsP, InGaAs/InAlAs/InP, and related III-V semiconductors. It is probably feasible to use group IV materials such as SiGe/Si strained-layer superlattices.

To be specific about these effects, in multiple quantum wells we have the quantum-confined Stark effect, which is a field-effect involving a redshift of the spectrum. We also have phase space absorption quenching, a quantum version of the Burstein-Moss blue shift of the spectrum. This is basically a bandfilling effect due to carrier injection. In asymmetric coupled quantum wells we can get an indirect spatial transition between the wide and narrow wells at electrical bias above the tunnelling resonance (a field effect that leads to large refractive-index perturbations).

In superlattices, we can get the Wannier-Stark effect, a field effect that includes a blue shift of the absorption spectrum, plus large index changes.

In bulk heterostructures, we get the Franz-Keldysh effect, a quadratic-like field effect with large n near the bandedge. There is the Pockels effect too; a strong linear electrooptic effect. We also get the free-carrier plasma dispersion effect.

The size of these effects is as follows: the peak index change $\Delta n$ is about 0.03 in any of these effects (at an E field of $1 \times 10^5$ Volts/cm or at an injection of about $1 \times 10^{-3}$ excess carriers). However, this usually occurs at a wavelength where the induced loss $\Delta k$ is large. If we move to a longer wavelength where $\Delta k$ becomes negligible, then the induced $\Delta n$ typically falls to about 0.01. Thus, it is probably realistic to say that $\Delta n = 0.01$ is the largest usable index perturbation in the FP. In this case, we find for the FP reflector that $L = 25\lambda$. At 1.3 $\mu$m, $L = 32.5$ $\mu$m and at 1.5 $\mu$m, $L = 38.8$ $\mu$m.

The excess optical loss within an FP element should be kept quite small for high finesse and for the cascading of many elements. The optical loss in a semiconductor waveguide presents a potential problem, but a solvable problem. There are two kinds of loss: that without electrical bias on the FP and that with bias. There is an absorption tail that governs zero bias loss. One must choose an optical wavelength that is "near" the bandgap wavelength to obtain large electrooptic effects. But the wavelength must not be "too near" to avoid loss.

With regard to the zero bias loss, we note that each year advances are being made in reducing the loss of semiconductor heterostructure waveguides. Presently, the loss of high quality guides is in the 0.1 to 0.2 dB/cm range, and will be nearer 0.1 dB/cm in the future. This is good enough for this invention. During bias, the optical loss can become a problem if the physical electrooptic effect involves a redshift of the absorption edge. In that case, one would detune the operating photon energy a few meV further from the edge, accepting a somewhat lower n in that case. More generally, in an electrooptic effect we get a perturbation of the real index and of the extinction coefficient: $\Delta n + i \Delta k$. We choose $\lambda$ for large $\Delta n$ and small $\Delta k$. Generally, we believe that excess losses (biased and unbiased) of less than 0.1 dB per FP element are feasible.

A potential problem exists in the choice of the optical wavelength. The electrooptic effects in quantum-well structures are relatively wavelength sensitive (and temperature sensitive). Thus, one must usually choose a wavelength within a fairly narrow band for the desired voltage response. In addition, the FP requires a wavelength that gives high transmission at zero bias, and high reflectance during bias. It may be difficult to select a wavelength that meets the FP and QW requirements simultaneously.

It should be noted that variable electrooptical reflectors within the waveguide can be obtained without using the FP resonant mirrors at each active location, although in that case the strength of the reflected light will be relatively low; about 1% of the incident light power. If the pairs of mirror slots are removed and if a strong electro-absorption (or electro-refraction) effect is used within the electroded waveguide area, then about 1% of the forward-traveling light will be reflected backwards in the guide from the electrode location when that electrode is biased ON fully. Conversely, when the electroded area is biased off, that region is essentially transparent to forward light, assuming that a subgap optical wavelength is used.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

We claim:

1. A variable time delay electrooptic device comprising:
    (a) a light pulse waveguide delay line having a plurality of Fabry-Perot resonator etalon elements therein, said etalon elements each including a semiconductor resonator core; and
    (b) electrical biasing means for selectively biasing said etalon elements to a first light transmissive state or to a second light reflective state where light impinging upon said etalon element is reflected backwardly, thereby to establish a given time delay.

2. The electrooptic device of claim 1 wherein said semiconductor resonator core is positioned in the mid-region of a p-i-n diode.

3. The electrooptic device of claim 1 wherein said semiconductor resonator core is located in the gate region of an electrooptic field effect transistor.

4. The electrooptic device of claim 3 wherein said resonator core includes multiple quantum wells or superlattices.

5. The electrooptic device of claim 1 wherein said resonator core includes multiple quantum wells or superlattices.

6. The electrooptic device of claim 1 wherein said etalon elements are tandemly positioned within said light pulse delay line.

7. A variable time delay electrooptic device comprising:
   (a) a light pulse waveguide delay line having a plurality of Fabry-Perot resonator etalon elements therein, said etalon elements each including a semiconductor resonator core having two in-channel parallel reflective end facets for providing light reflectivity of between ten and thirty percent; and
   (b) electrical biasing means for selectively biasing said etalon elements to a first light transmissive state or to a second light reflective state where light passing through said etalon element is reflected backwardly, thereby to establish a given time delay.

8. The electrooptic device of claim 7 wherein said semiconductor resonator core is positioned in the mid-region of a p-i-n diode.

9. The electrooptic device of claim 7 wherein said semiconductor resonator core is located in the gate region of an electrooptic field effect transistor.

10. The electrooptic device of claim 9 wherein said semiconductor resonator core includes multiple quantum wells or superlattices.

11. The electrooptic device of claim 7 wherein said semiconductor resonator core includes multiple quantum wells or superlattices.

12. The electrooptic device of claim 11 wherein said etalon elements are tandemly positioned within said light pulse delay line.

13. The electrooptic device of claim 7 wherein said etalon elements are tandemly positioned within said light pulse delay line 14. A variable delay electrooptic device comprising:
   (a) a first stage including a light pulse delay line having a plurality of Fabry-Perot semiconductor resonator etalon elements tandemly positioned therein, said etalon elements each including a rib-like semiconductor resonator core having two in-channel parallel reflective end facets for providing a light reflectivity of between ten and thirty percent;
   (b) electrical biasing means for selectively biasing said resonator etalon elements to a first light transmissive state or to a second light reflective state whereby light passing through said etalon element is reflected backwardly;
   (c) an input/output light pulse port means for inputting light pulses into said variable delay electrooptic device and for outputting light therefrom; and
   (d) a second stage including a plurality of variable length waveguide segments, and electro-optic switching for coupling one waveguide segment of said plurality of variable length waveguide segments between said input/output light pulse port means and said first stage.

15. A variable delay electrooptic device comprising:
   (a) a first stage including a light pulse delay line having a plurality of tandemly positioned Fabry-Perot resonator etalon elements each having a semiconductor resonator core;
   (b) electrical biasing means for selectively biasing each semiconductor core to a first light transmissive state or to a second light reflective state for causing light passing through only one selected etalon element to be reflected backwardly; and
   (c) a second stage including a plurality of variable length waveguide segments and switching means for coupling only one waveguide segment of said plurality of variable length waveguide segments to said first stage.

16. The electrooptic device of claim 15 wherein said semiconductor resonator core is positioned in the mid-region of a p-i-n diode.

17. The electrooptic device of claim 16 wherein said resonator core includes multiple quantum wells or superlattices.

18. The electrooptic device of claim 15 wherein said semiconductor resonator core is located in the gate region of an electrooptic field effect transistor.

19. The electrooptic device of claim 15 wherein said semiconductor resonator core includes multiple quantum wells or superlattices.

20. A variable time delay electrooptic device comprising:
   (a) a light pulse waveguide delay line having an upper cladding and a plurality of Fabry-Perot resonator etalon elements tandemly positioned therein, said etalon elements each including a rib-like semiconductor resonator core having two in-channel parallel end cuts on opposite sides of said resonator core, and extending through said upper cladding and core, for providing a light reflectivity of between ten and thirty percent; and
   (b) electrical biasing means for selectively biasing said etalon elements to a first light transmissive state or to a second light reflective state where light passing through said etalon element is reflected backwardly, thereby to establish a given time delay.

21. The electrooptic device of claim 20 wherein said semiconductor resonator core is positioned in the mid-region of a p-i-n diode.

22. The electrooptic device of claim 20 wherein said semiconductor resonator core is located in the gate region of an electrooptic field effect transistor.

23. The electrooptic device of claim 22 wherein said semiconductor resonator core includes multiple quantum wells or superlattices.

24. The electrooptic device of claim 20 wherein said semiconductor resonator core includes multiple quantum wells or superlattices.

25. The electrooptic device of claim 20 including an input/output light pulse port means for inputting light pulses into said variable time delay electrooptic device and for outputting light therefrom, said port means including at least one fiber-optic cable interfacing portion coupled to said semiconductor resonator core via a tapered waveguide section.

26. A variable time delay electrooptic device comprising:
   (a) a light pulse waveguide delay line having a plurality of Fabry-Perot resonator etalon elements tandemly positioned therein, said etalon elements each including a semiconductor resonator core having two in-channel parallel reflective end facets for providing light reflectivity of between ten and thirty percent; and
   (b) electrical biasing means for selectively biasing said etalon elements to a first light transmissive state or to a second light reflective state where light passing through said etalon element is reflected backwardly, thereby to establish a given time delay.

27. The electrooptic device of claim 26 wherein said waveguide delay line is coiled into an elongated spiral having large-radius bends.

28. The electrooptic device of claim 27 wherein said semiconductor resonator core is positioned in the mid-region of a p-i-n diode.

29. The electrooptic device of claim 27 wherein said semiconductor resonator core is located in the gate region of an electrooptic field effect transistor.

30. The electrooptic device of claim 27 wherein said semiconductor resonator core includes multiple quantum wells or superlattices.

31. The electrooptic device of claim 26 wherein said semiconductor resonator core includes multiple quantum wells or superlattices.

* * * * *